United States Patent [19]
Kaneto et al.

[11] Patent Number: 5,556,700
[45] Date of Patent: Sep. 17, 1996

[54] CONDUCTIVE POLYANILINE LAMINATES

[75] Inventors: Keiichi Kaneto, Fukuoka, Japan; Yonggang Min, Philadelphia; Alan G. MacDiarmid, Drexel Hill, both of Pa.

[73] Assignee: Trustees of the University of Pennsylvania, Philadelphia, Pa.

[21] Appl. No.: 218,130

[22] Filed: Mar. 25, 1994

[51] Int. Cl.$^6$ ........................................... B23B 9/04
[52] U.S. Cl. ...................... 428/332; 252/500; 428/411.1
[58] Field of Search .............................. 428/411.1, 332; 528/422; 525/540; 252/500

[56] References Cited

U.S. PATENT DOCUMENTS 4,025,691  5/1977  Trevoy ...................................... 428/411

*Primary Examiner*—Dhirajlal Nakarani
*Attorney, Agent, or Firm*—Woodcock Washburn Kurtz Mackiewicz & Norris

[57] ABSTRACT

Laminates containing a layer of conductive polyaniline are provided for various uses such as actuator devices. The laminates are controllably deformable and can operate on an electromechanical, chemomechanical, and mechanoelectrical modes. The laminates are preferably constructed so as to have a first flexible layer of polyaniline and a second flexible layer of polyaniline surmounted thereon. The polyaniline layers are separated by an electronically insulating layer.

21 Claims, 7 Drawing Sheets

CONDUCTIVE POLYANILINE LAMINATES

FIELD OF THE INVENTION

The present invention relates to actuators constructed with conductive polyaniline. More specifically, the invention relates to actuators constructed with a layer of polyaniline, the actuator being able to function in either an electromechanical, chemomechanical, or mechanoelectrical mode.

BACKGROUND OF THE INVENTION

Researchers are continually investigating the usefulness of various materials in the construction of actuator devices. Such devices have a multitude of uses commonly known and understood by those skilled in the art. Actuators are capable of changing form or shape in response to a stimulus or condition and, thus, to effect or "actuate" a transformation or action. Examples of actuator applications include their use as sensors for the electronic, medical, and chemical industries. In this context, the sensors are capable of reacting to changes in the environment in which they are placed and relaying a signal to indicate such a change.

Recent advances in this field relate to use of polymers as a constituent of actuator devices. Of particular interest are those polymeric systems that operate in either an electromechanical, chemomechanical, or mechanoelectrical mode, or in all such modes.

Conductive polymers such as polyaniline, polypyrrole, and polyacetylene can increase their electrical conductivity from the insulator to metallic regime upon the occurrence of certain chemical or electrochemical doping reactions. These reactions have been shown to be accompanied by a change in the volume of the polymer, such that the polymers can be manipulated to expand or contract.

Certain conductive polymer systems have been proposed as possible artificial muscles. It has been shown by Otero et al., *Intrinsically Conducting Polymers: An Emerging Technology* (M. Aldissi, ed.), 179–190 (1993), that a polypyrrole film can be used as an electrode in an electrochemical cell in connection with a platinum counterelectrode and a $LiClO_4$ aqueous electrolyte solution. Movement in the polypyrrole film can be initiated by creating a potential between the two electrodes. Another polymeric system, weakly cross-linked poly(2-acrylamido-2-methyl propane) sulphonic acid (PAMPS), has been used as a possible artificial muscle material as shown by Osada et al., *Nature*, 355, 242–244 (1992). However, these require counterelectrodes external to the actuator device for use thus limiting their efficiency and utility.

A need exists for advanced polymeric actuator devices. Particularly, it is desired to produce polymeric actuators that operate without the need for a counterelectrode that does not participate in the actuation.

SUMMARY OF THE INVENTION

The present invention provides for laminates containing a layer of polyaniline. The laminates are controllably deformable and the polyaniline is preferably in a highly conductive salt form. The laminates are useful as actuators that can be operated on or in electromechanical, chemomechanical, or mechanoelectrical modes, or in all such modes.

The laminates can be constructed in various configurations depending on the desired application. In one embodiment, the laminate is constructed with a first flexible layer containing an electronically conductive form of polyaniline, and preferably this first flexible layer is constructed entirely of the polyaniline. A second flexible layer of an electronically conductive material is surmounted on the first flexible layer. The second flexible layer is preferably also constructed of an electronically conductive form of polyaniline. Interposed between the first and second layers is a flexible, electronically insulating layer. Another embodiment can be constructed by using a flexible, electronically insulating, ionically conductive layer interposed between the first and second layers.

DETAILED DESCRIPTION OF THE INVENTION

Figure 1:
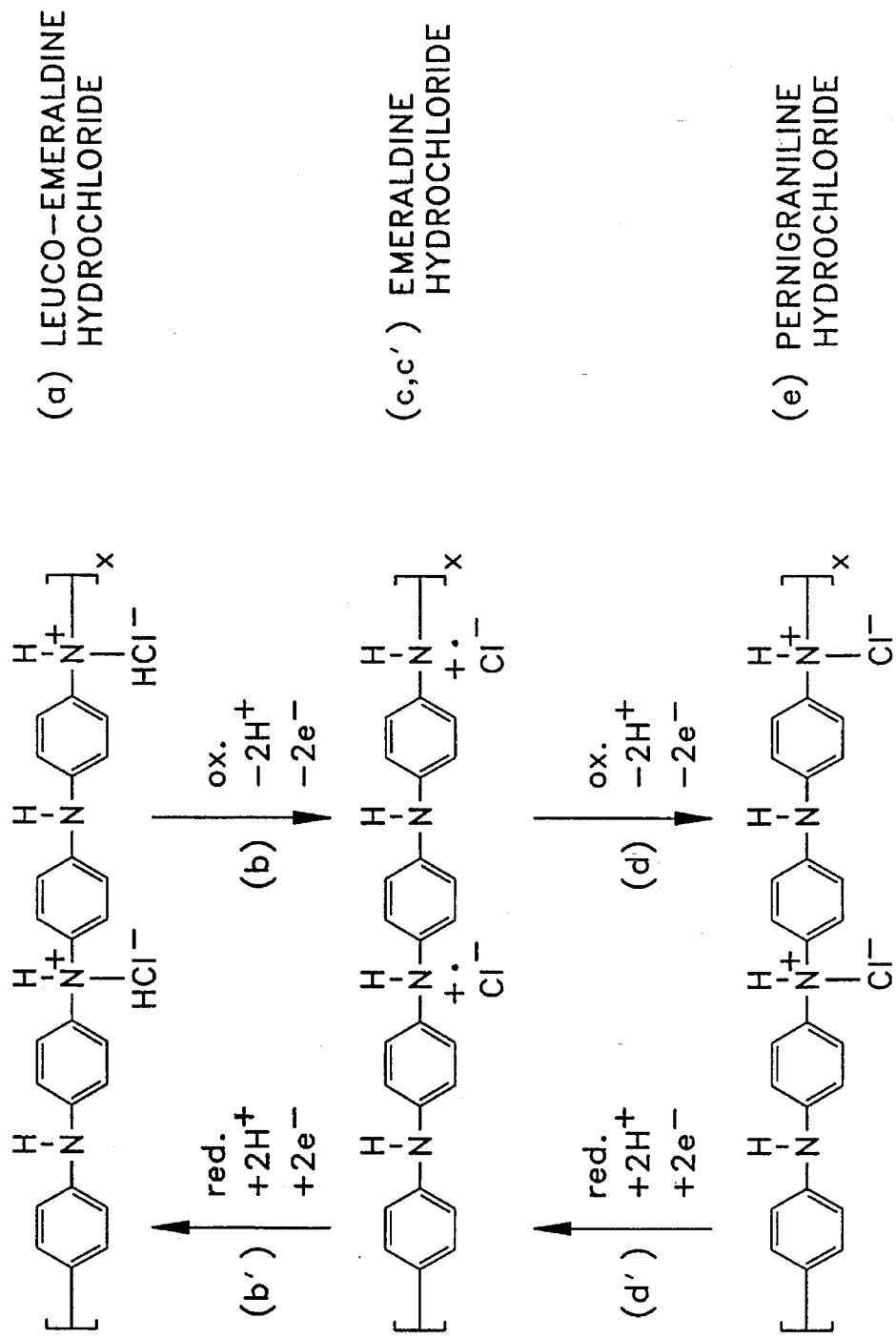
FIG. 1 is a representation of the electrochemical cycle of polyaniline in aqueous HCl solution.

Polymer actuators that can be operated in an electromechanical mode by the electrochemical oxidation and reduction of polyaniline are highly useful in various applications. Polyaniline actuators can also operate in a chemomechanical and mechanoelectrical mode, thus further extending their utility in various applications. The polyaniline actuators can be constructed so that the polyaniline material can function as both the cathode and anode on a single actuator, thus increasing the effectiveness of the actuator.

The polymer actuators are constructed with a flexible, conductive layer of polyaniline. The term "aniline" as used herein is intended to include compounds represented by formula (1):

wherein R and R' are, independently, H, alkyl or alkoxyl having from about 1 to about 6 carbon atoms. The term "polyaniline" as used herein is intended to encompass the polymers produced upon the polymerization of the compounds having the formula (1), including N-substituted derivatives thereof having alkyl or other organic functional groups attached to one or more nitrogens of a polyaniline chain.

Generally, the preparation of polyaniline comprises mixing aniline, protonic acid, and a polymerization agent or initiator in aqueous media, preferably at a temperature above about −5° C., more preferably between about 0° C. and 5° C., and then recovering the resultant product from the mixture. Representative examples of such preparatory methods and the polyanilines made therefrom are shown in U.S. Pat. Nos. 5,147,913 and 5,177,187, both to MacDiarmid et al., both of which are incorporated herein in their entirety. Specifically, a polymerization agent, such as ammonium persulfate, is presented in a protonic acid solution, such as a 1M HCl solution, and this solution is added to aniline also dissolved in about 1M HCl, and the resulting solution maintained at the reaction temperature. The precipitate formed is collected and washed with about 1M HCl to yield emeraldine hydrochloride. This salt may be converted to emeraldine base by treatment with about 0.1M NH$_4$OH. Higher molecular weight polyanilines can be prepared in accordance with the procedures set forth in U.S. Pat. No. 5,276,112 to MacDiarmid et al. and in PCT application PCT/US 92/09709, filed Nov. 6, 1992 to MacDiarmid et al., which are both incorporated herein in their entirety. Generally, the preparation comprises mixing aniline, protonic acid, salt, and a polymerization agent or initiator in aqueous media, preferably at a temperature below about −10° C., and then recovering the resultant product from the mixture. Useful salts include lithium chloride, sodium chloride, ammonium sulfate and mixtures thereof.

The polyaniline precipitate which is formed is collected and washed typically with protonic acid and/or organic solvent to provide a salt having, for example, formula (2), where A is an anionic species and Y is from 0 to 1. It will be appreciated that the exact formula of the polyaniline product will depend upon the particular starting materials and reaction conditions employed.

about 0.5 exhibit greater conductivity than such polymers having different Y values.

It is preferred to use stretch aligned polyaniline in the construction of the actuators. It has been shown, see e.g. MacDiarmid et al., *Synth. Met.*, 55, 753 (1993), which is incorporated herein in its entirety by reference, that when emeraldine base films are stretch aligned and then protonated, i.e. doped, by an aqueous protonic acid solution, such as aqueous hydrochloric acid, that the conductivity parallel to the stretched direction is greatly increased. For instance, the conductivity in the non-stretched direction is less than about 10 S/cm, and is greater than about 200 S/cm in the stretched direction. The use of a stretched film, that is aligned to have the stretch direction parallel to the length of the film in the actuator, enhances the response rate of the actuator.

Polyanilines having higher conductivities can be produced by employing secondary doping techniques during the synthesis of the polymer. These techniques are described in U.S. patent application Ser. No. 105,743 filed Aug. 12, 1993, now U.S. Pat. No. 5,403,913, to MacDiarmid et al., which is incorporated herein in its entirety. Generally, the technique is accomplished by contacting, such as by wetting, a substantially solid polyaniline film, which has been initially doped with a protonic acid, with a phenolic compound, such as monosubstituted phenols, and preferably cresol compounds.

Polyaniline exhibits distinct features over various of the other known conductive polymers. The insulative emeraldine base form can be converted to the conductive emeraldine salt form by treating the base with an aqueous salt solution, for example, aqueous HCl. The conductive salt

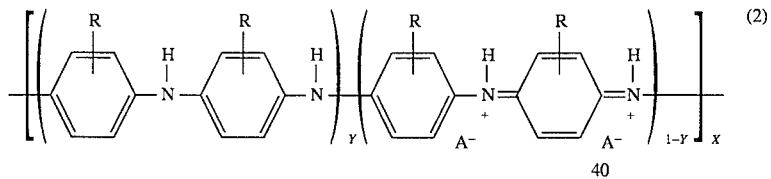

(2)

Polyaniline salts of formula (2) can be converted to bases having formula (3) by treatment with aqueous base comprising, for example, ammonium hydroxide. The resulting polyaniline base, preferably in the emeraldine oxidation state, can then be recovered by known techniques such as washing with aqueous base and organic solvents followed by vacuum drying.

form of polyaniline can exist typically in three oxidative states depending on the degree of oxidation. As shown in FIG. 1, the emeraldine salt (c, c'), here shown with the anionic species Cl$^-$, as emeraldine hydrochloride, can undergo oxidation or reduction in aqueous acid solutions, such as HCl solutions, giving rise to pernigraniline (e) and leucoemeraldine (a) salts, respectively.

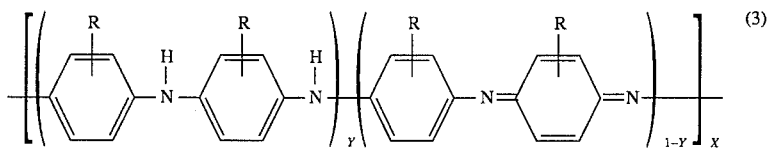

(3)

As will be recognized, it is difficult to characterize polyanilines precisely. For example, the exact position of the protonated nitrogens in the polyaniline backbone cannot be unequivocally assigned; resonance structures may be significant. It is preferred that the polyaniline salts and polyaniline bases of the present invention be generally in accordance with structures (2) or (3), respectively. It is also preferred that Y be between about 0.4 to about 0.6, as determined by titration of the polymer salt with titanium trichloride. It is particularly preferred that Y be about 0.5, as it is known that unsubstituted polyanilines wherein Y is The electrochemical oxidation and reduction of emeraldine salt in aqueous acid is accompanied by proton transfer. The electrochemical oxidation of the polyaniline salt forms occurs with the removal of both protons and electrons from the corresponding nitrogen atom. Similarly, the electrochemical reduction of the polyaniline salt forms occurs with the addition of both protons and electrons to the corresponding nitrogen atom. The change in the polyaniline physical structure, from the phenyl to quinoid structure of the benzene ring, is induced during oxidation with a corresponding reversal for reduction.

The electrochemical oxidation and protonation of the polyaniline salt is accompanied by an expansion of the polymer. Similarly, the electrochemical reduction and deprotonation of the polyaniline salt is accompanied by a contraction of the polymer. This expansion/contraction characteristic of the polyaniline gives rise to its ability to function as an actuator device.

Figures 2A, 2B:
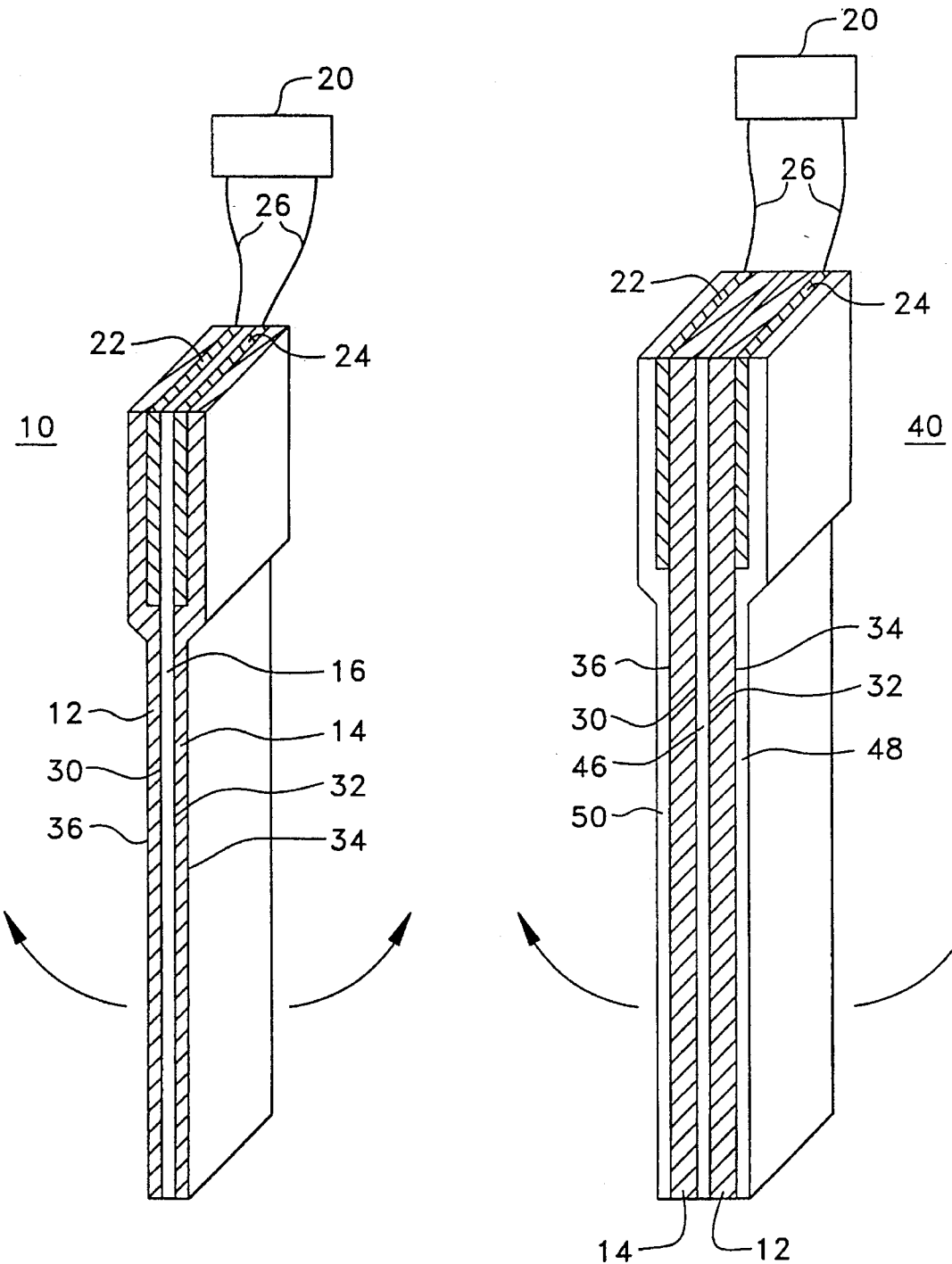
FIG. 2(a) shows a representative actuator construction of the present invention.
FIG. 2(b) shows another representative actuator construction of the present invention.

Representative actuator constructions are set forth in FIG. 2. In FIG. 2(a) the actuator 10 is of a "backbone" type construction having opposing layers of a conductive material 12, 14 separated by an interposed layer 16. At least one of the conductive layers 12, 14 contains a salt form of polyaniline. The other conductive layer can be constructed of any flexible material processed so that it is electrically conductive. Examples of suitable materials include polypyrrole, polyacetylene, and their analogues, along with such materials as polyethylene modified with a thin layer of a conductive material, such as a conductive metal, and various other materials. Preferably, however, both conductive layers 12, 14 contain salt forms of polyaniline. The interposed layer 16 in this construction is an electronically insulating material. The interposed layer 16 can be made of various materials, preferably such that it has adhesive properties to securely hold the inner faces 30, 32 of the respective conductive layers 12, 14 in a set position. The interposed layer 16 is preferably constructed of a material that changes its dimension to a lesser degree than the polyaniline film layer, or more preferably does not change in its dimension to a significant degree, upon being subjected to the conditions that operate the conductive polyaniline as an actuator, therefore providing a reference substrate against which the polyaniline film layer can expand or contract, resulting in a bending of the polyaniline film layer. The interposed layer 16 can be either ionically conductive or ionically non-conductive. Examples of materials that can be used for layer 16 are double sided cellophane tape and adhesive solid polymer electrolytes.

The actuator 10 can be electronically wired to a control means for supplying and for accepting current 20 by means of a negative contact 22 and a positive contact 24 and corresponding connection leads 26. The contacts and leads are made from suitable conductive materials, such as conductive metals like platinum. The control means 20 can be used to apply a selective voltage potential to the actuator, to supply an alternating current to the actuator, or to accept a current from the actuator. The control means 20 can, in turn, be connected electronically to other systems so as to act upon them.

The polyaniline actuator device can be constructed in a "shell" type configuration as shown by actuator 40 in FIG. 2(b). Again, the actuator 40 contains opposing layers 12, 14 of a flexible conductive material made from the same materials of construction as actuator 10. Also, the actuator 40 is similar to actuator 10 in the use of the control means 20 and contacts 22, 24 and leads 26. The interposed layer 46 in this construction is made of an electronically insulating, ionically conductive material. This type of actuator is preferably constructed with electronically insulating layers 48, 50 surmounted onto the outer faces 34, 36 of the conductive layers 12, 14, respectively. The electronically insulating layers 48, 50 can be of any suitable material of construction that is flexible and can impart the necessary structure to the actuator.

The actuators 10, 40 can be constructed in various dimensions depending on its desired end use. Generally, however, it is preferred that the conductive layers 12, 14 be less than 1 cm, preferably less than 1 mm, and more preferably from about 1 micron to about 200 microns, thick. Further, although it is preferred that the conductive layers 12, 14 be constructed of the conductive polyaniline entirely, these layers can have other materials incorporated therein so long as the utility of the actuator is not lost.

The operation of the actuator 10, when ionically and electronically non-conductive material is used as the interposed layer 16, can be accomplished by placing it in an electrolytic fluid environment so that ionic transfer can occur between the polyaniline salt layer and the electrolyte species. An example of such an environment includes an aqueous electrolytic solution. Electrolytic solutions are well known to those of skill in the art and include solutions containing protonic acids having the general formula $H_xA_y$ wherein x and y are each 1–8, H is hydrogen, and A is an anionic moiety such as, for example, $Cl^-$, $Br^-$, $I^-$, $SO_3^-$, $PO_3^-$, $SO_4^{2-}$, $PO_3^{3-}$, $ClO_4^-$, or $CH_3CO_2^-$. Useful anionic moieties further include: polymeric anions such as polystyrene sulfonate or polyvinylsulfonate; thermally stable anions such as $B_{12}H_{12}^{-2}$, benzene sulfonate, or p-toluene sulfonate; and long chain fatty acids such as dodecyl sulfonate. Preferred protonic acids include hydrochloric acid, hydrobromic acid, sulfuric acid, polyvinyl sulfonic acid, polystyrene sulfonic acid, toluene sulfonic acid, and combinations thereof; polystyrene sulfonic acid and polyvinyl sulfonic acid are particularly preferred.

Actuators 10 and 40, employing an ionically conductive material in interposed layers 16, 46, can be operated in free space, that is, without an external surrounding electrolyte. Examples of materials useful for the construction of these interposed layers include porous materials wetted with an aqueous electrolyte solution similar to those used in the operation of actuator 10, and solid polymeric electrolytes. Solid polymeric electrolyte compositions are well known and are commonly employed in such systems as solid state lithium batteries. Examples of the solid polymeric electrolyte compositions include compositions containing polyethylene oxide.

The electromechanical operation of actuator 10 can be accomplished by applying a voltage potential across the negative and positive contacts 22, 24 through the control means 20. The operation of actuator 10 can be conveniently described for the situation where polyaniline films constitute both layers 12, 14. The resultant electronic current will induce an electrochemical reaction between the polyaniline layer surfaces 34, 36 and the surrounding electrolytic solution. If both layers contain the polyaniline in the emeraldine salt form, then the reduction induced at the negative bias contact will cause the film to contract, while the oxidation induced at the positive bias will cause the opposite film to expand, resulting in a bending of the actuator 10. The actuator 10 will bend in either direction depending on the polarity. The convex part corresponds to the positive bias, and the concave part to the negative bias. The degree of bending can be controlled based on the voltage potential applied. Thus, the control means 20 can be used to selectively position the actuator and control its degree of bending.

The bending of the actuator 10 is enhanced by using polyaniline salt as the material of construction for both conductive layers 12, 14. This construction is advantageous for various reasons. With reference to FIG. 1, when two emeraldine salt films are used as the conductive layers, they act as the cathode and the anode in the actuator. The application of a voltage potential between the two films results in the anode film following oxidation path (d) to form the pernigraniline salt (e), and similarly, the potential causes the cathode film to follow reduction path (b') resulting in the leuco-emeraldine salt (a). The number of protons discharged at the anode is the same as the number accepted at the cathode. Reversal of the polarity results in the pernigraniline salt (e) following reduction path (d') and the leuco-emeraldine salt (a) following the oxidation path (b). This process is repeated upon the application of an alternating current. During operation of the polyaniline actuator, there is no loss of ionic mass between the polyaniline film layers, thus indicating an efficient use of the electrolytic solution. Also, there is no requirement for a counterelectrode that does not play an active role in the movement of the actuator, and, in fact, the second polyaniline film layer enhances the induced movement.

The electromechanical operation of actuator 40 can be accomplished in a similar fashion to that just described with respect to actuator 10. Again, a voltage potential is applied to the actuator 40 by means of the control system 20 causing an electrochemical oxidation or reduction of the polyaniline salt film layer. This oxidation or reduction will result in a corresponding expansion or contraction of the polyaniline salt layer and cause movement in the form of bending in the actuator 40. Similarly, the bending can be enhanced by employing polyaniline salt as the material of construction for both conductive layers 12, 14.

Further, actuators 10, 40 can additionally be operated in a mechanoelectrical mode. A force can be directed against the actuators to impart bending of the actuator. This induced bending generates an electrical current that can be directed to flow to the control means 20. When the force is removed, and the actuator allowed to resume its neutral position, another electrical current can be generated.

Figure 3:
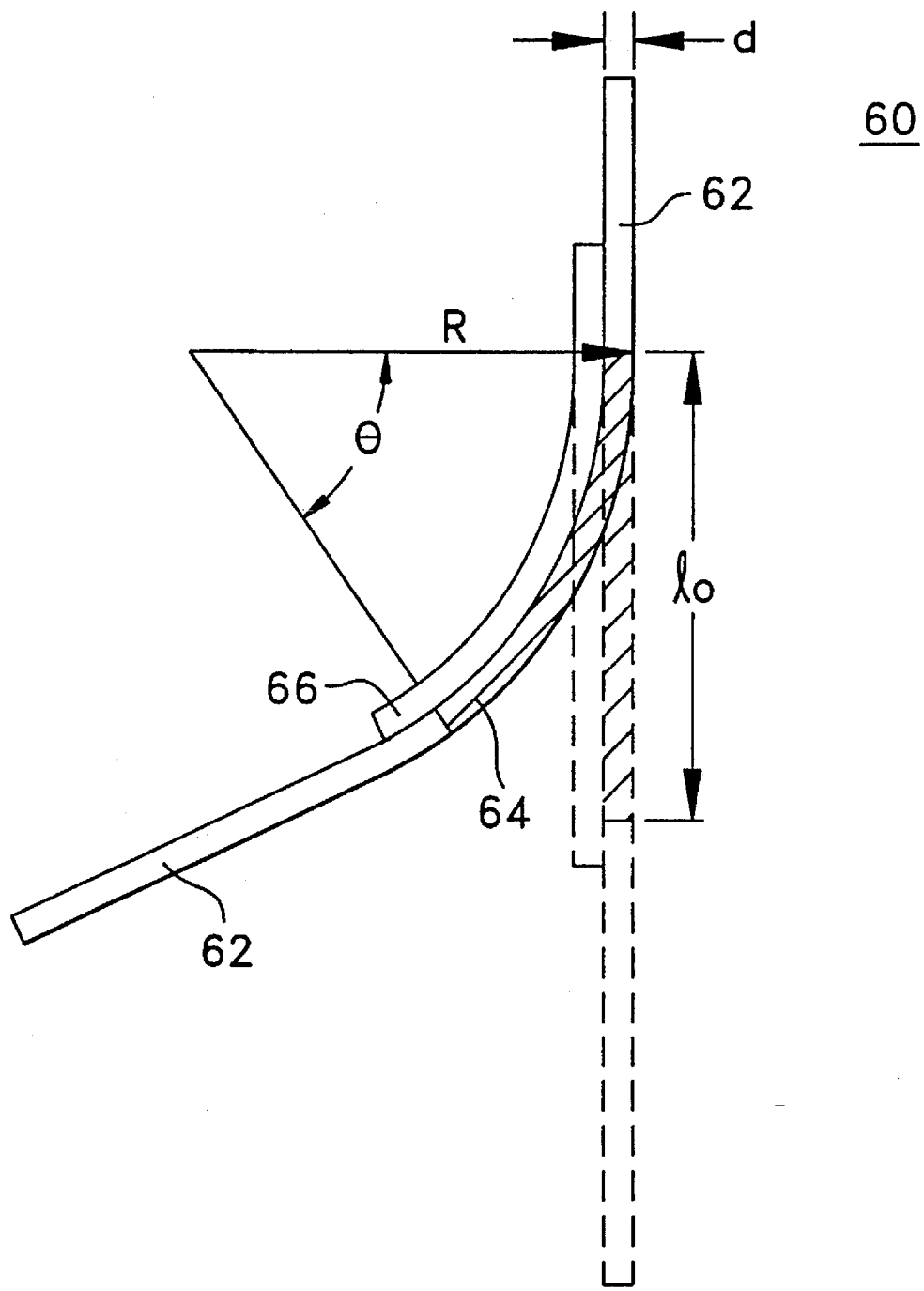
FIG. 3 represents a pH sensitive actuator construction of the present invention.

Both actuators 10, 40 can also be operated in a chemomechanical mode in which movement or bending of the actuator is accomplished by altering the ionic concentration of either the surrounding electrolytic environment, with respect to actuator 10, or within the layer 46, with respect to actuator 40. This chemomechanical mode of operation is advantageous for the construction of a pH sensing device that actuates upon altering the pH of the fluid that is in contact with the polyaniline film. An example of such a device is shown in FIG. 3 wherein the pH sensor 60 contains an indicator 62 having an interposed piece of polyaniline film 64 held together by connection means 66, such as a piece of cellophane tape. The indicator 62 is utilized to facilitate the measurement of the bending, the bending angle, easily. As is well known by those of skill in the art, other constructions of a pH sensing device can be constructed based on the disclosed principles, such as, for example, a coil-like construction of the polyaniline film having affixed thereto a flexible layer that is preferably constructed of a material that changes its dimension to a lesser degree than the polyaniline film layer, or more preferably does not change in its dimension to a significant degree, upon being subjected to the various pH conditions, therefore providing a reference substrate which the polyaniline film layer can expand or contract against, resulting in a bending of the polyaniline film layer.

The actuators described herein can be used in a multitude of devices. Examples of uses of the actuators in the electromechanical mode include their use in medical devices such as a tip director for a catheter, in industry as valves and control devices, and in artificial muscles for internal organs and robot devices. Examples of uses of the actuators in the chemomechanical mode include ionic species detection devices, such as pH sensors for controlling other systems or measuring pH. Examples of uses of the actuators in the mechanoelectrical mode include their use as electromechanical force generators.

EXAMPLES

Example 1

A. Fabrication of polyaniline films

Polyaniline films were prepared by the methods reported by MacDiarmid et al., Synth. Met., 41–43, 735–738 (1991); Synth. Met., 55–57, 753–760 (1993), which are incorporated herein in their entirety. Polyaniline emeraldine base powder ($M_w$=54,000; $M_n$=21,000) was dissolved in 1 N-methyl 2-pyrrolidinone (NMP) (about 12% wt.), then cast on a glass substrate. The NMP was evaporated by heating at 40°–50° C. using an IR lamp for about 24 hours. The resultant film had a thickness of about 50–100 μm containing 10–20% wt. NMP. The film was peeled from the glass and stretched to about 4 times its original length and protonated by sonicating the film in 1M HCl aqueous solution for several minutes. The conductivity of the film was about 80–100 S/cm along the stretched direction and about 15–20 S/cm perpendicular to the stretched axis.

B. Fabrication of backbone actuator

A backbone type actuator was constructed by attaching two pieces of the emeraldine salt film (8 mm wide, 25 mm long; 8 mg weight) to a double-sided cellophane tape having a thickness of about 90 μm, one piece being attached to each adhesive side of the tape. Two platinum foils with platinum wires were placed between the emeraldine salt films and the tape as shown in FIG. 2(*a*).

C. Fabrication of shell actuator

A shell type actuator was constructed by placing a piece of emeraldine salt film (6 mm wide, 25 mm long; 12 mg weight) to one side of cellophane tape having a thickness of about 60 μm. A second such film/tape layer was also made. The two film/tape layers were placed facing each other with a 40 μm thick paper placed between them as shown in FIG. 2(*b*). A 1M HCl solution was injected by syringe into the paper. This construction was referred to as the "shell A" construction.

A "shell B" construction was made by replacing the paper between the emeraldine salt films with a polymer electrolyte containing 10 wt. % LiCl, 60 wt. % poly(ethylene oxide) ($M_w$=100,000), 20 wt. % poly(styrene sulfonic acid) ($M_w$=50,000), and 10 wt. % 1,6-diisocyanatohexane. The emeraldine salt films had a width of 8 mm, a length of 30 mm, and a thickness of 35 μm, and weighed about 10 mg in this construction.

D. Results from backbone actuator

The backbone actuator was positioned in a 1M HCl aqueous solution. A voltage of about 1.5V was applied between the two films of the actuator, and scanned at a rate of about 200 mV/sec. The actuator, initially extending in a downward position, bent in both directions depending on the polarity. The actuator was found to bend over 360° upon the application of a 2.5 V potential. It was found that the bend angle of the film could be maintained by disconnecting the applied voltage, thus the actuator displayed positioning and memory properties. The actuator returned to the neutral position by shorting the leads. No gas, either hydrogen or oxygen, was observed at the film surfaces during the cycle.

Figure 4:
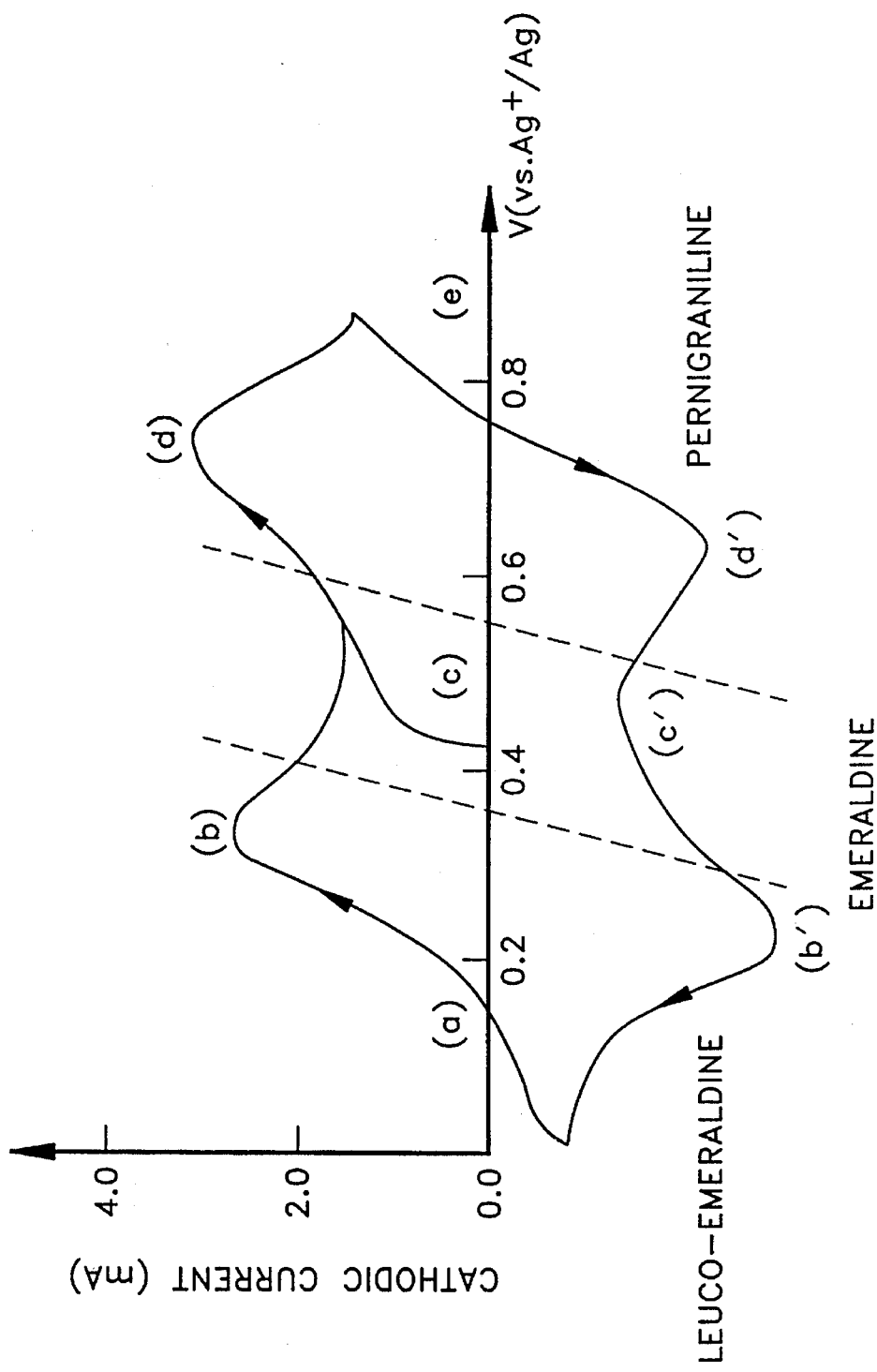
FIG. 4 is a cyclic voltammogram of a polyaniline film in an electrochemical cell with a reference electrode and a platinum counter electrode.

The electrochemical characteristics of the polyaniline film of the type used in the backbone actuators were determined by means of a cyclic voltamogram (CV) of the emeraldine salt polyaniline film using a counter electrode of platinum (Pt) foil and a reference electrode of silver wire is shown in FIG. 4, with letters corresponding to the electrochemical reaction states shown in FIG. 1. Total weight of the film was 5.1 mg. The scan rate was 1 mV/s. Prior to the electrochemical cycle, the initial potential of the emeraldine salt film versus the reference electrode was approximately 0.42 V, as shown at point (c). The oxidation peak at (d) and reduction peak at (d') of the CV curve correspond to the transition to and from the emeraldine and pernigraniline states. The oxidation peak at (b) and reduction peak at (b') of the CV curve correspond to the transition to and from the emeraldine and leuco-emeraldine states. Points (a) and (e) correspond to the leuco-emeraldine and pernigraniline states, respectively. In this cycle, bubbles of hydrogen gas were observed at the surface of the Pt counter electrode.

The response time of the constructed backbone actuator was also examined. Triangular waves of voltage up to 4.0 V with various scan rates were applied across the actuator. The actuator vibrated until the scan rate of 350 V/s, which was observed by eyes, though the bending angle became smaller. Namely, the actuator responded to 44 Hz of alternating current at least. At a scan voltage of between 0.2 V and 0.7 V versus the reference electrode, with the scan rate of 20 mV/s, the bending motion was observed more than 200 times without apparent decrease in the bending angle.

E. Results of shell actuator

The shell type A actuator was operated in air using a conventional 1.5 V battery. It took several seconds to reach the maximum bending position. This actuator easily lifted a weight of about 1 g. The bent film was able to maintain its position after the leads were disconnected and thus exhibited positioning or memory effect properties. By shoring the two leads, the film went back slowly to the original position. It was found that the sealing of the polyaniline layers was important for practical fabrication.

The shell type B actuator was tested in terms of bending angle, bending time and open circuit voltage as a function of applied voltages. A voltage was applied stepwise across the emeraldine salt films, then the bending time to the maximum angle was measured for several minutes. The circuit was disconnected and the open circuit voltage between the film layers was immediately measured. After measurement of the open circuit voltage, the circuit was shorted, resulting in the actuator at the initial position.

Figure 5:
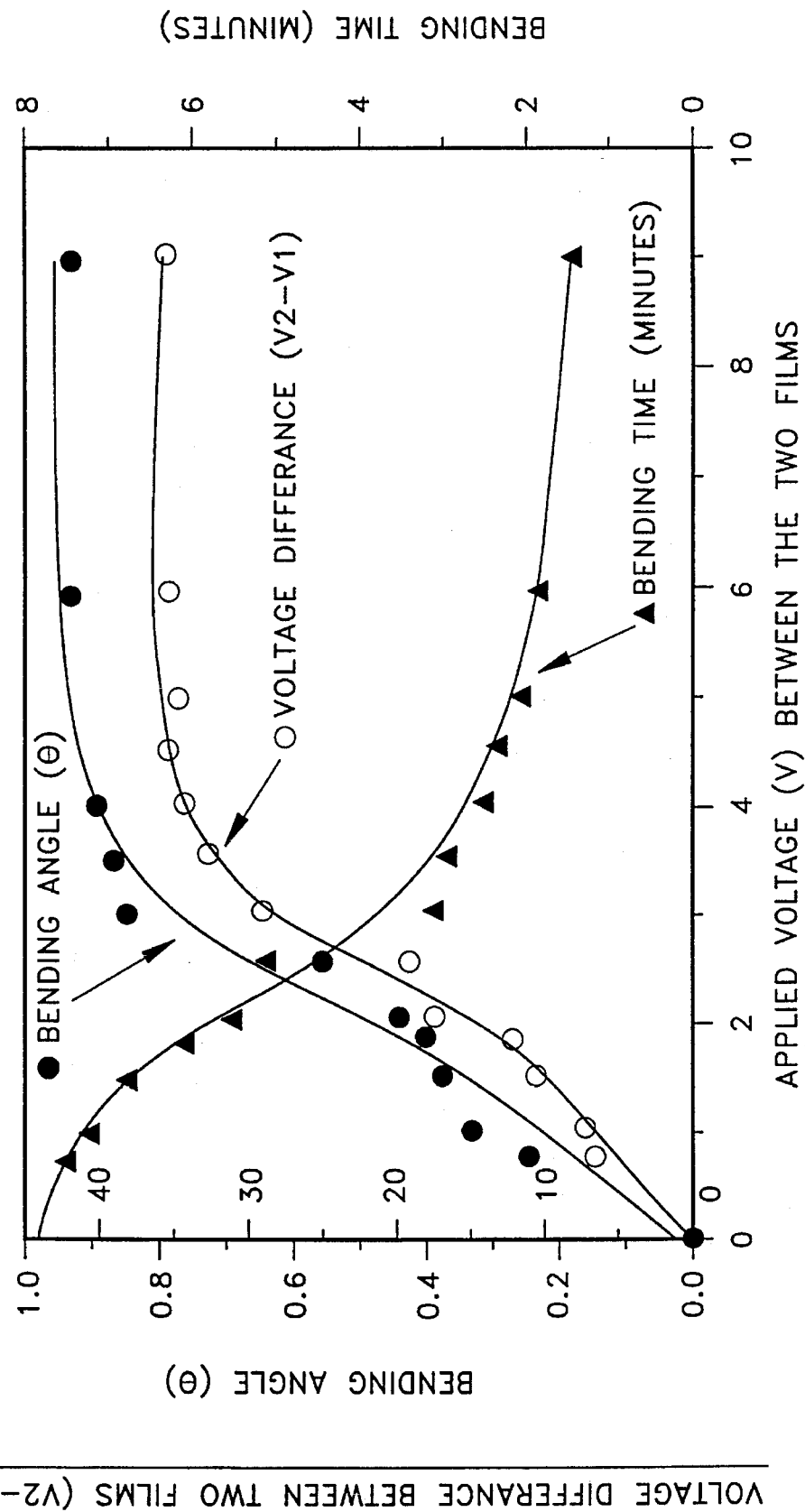
FIG. 5 is a graphical representation of the movement associated with an actuator constructed in accordance with FIG. 2(b).

The characteristics of the shell type B actuator are shown in FIG. 5 where the bending angle, voltage difference between the polyaniline film layers, and bending time (to reach approximate equilibrium) are shown as a function of the applied voltage potential. Below the applied voltage of 3 V, the bending motion was very slow, however, above 3 V, the movement became faster, and the nearly constant bending angle of approximately 40° and open circuit voltage, $[V_2-V_1]$, of 0.7–0.8 V were obtained. This voltage approximately corresponds to the potential difference between points (b) and (d) in FIG. 4, indicating the open circuit voltage of a polyaniline-polyaniline rechargeable battery. The shell type B actuator responds relatively slowly compared to those of backbone type and shell type A, and this may be associated with the lower ionic conduction in solid polymer electrolyte. The response is expected to be improved by using the electrolyte with higher ion mobility and the optimized structure.

Example 2 pH Sensitive Actuator

A pH sensitive actuator was prepared in accordance to FIG. 3. An emeraldine base film (prepared as set forth in Example 1, non-stretched) (1 mm wide, 5 mm long, and 60 μm thick) was treated several times with 1M HCl aqueous solution for doping and 0.1M NH$_4$OH for undoping. This treatment removes tension built into the film during processing. The film was then positioned on one side of cellophane tape (80 μm thick). Two thin indicators made of polyethylene terphthalate film (0.1 mm thick, 1 mm wide, 20 mm long) were attached to the ends of the polyaniline film to measure the bending angle in various solutions.

The expansion ratio, $\Delta l/l_o$, was estimated from the observed bending angle θ (rad) as shown in FIG. 3. The thickness of the polyaniline film layer is d, and its initial length is $l_o$, before being placed into the solution. The expansion ratio is then calculated as being equal to $\theta d/l_o$.

Figure 6:
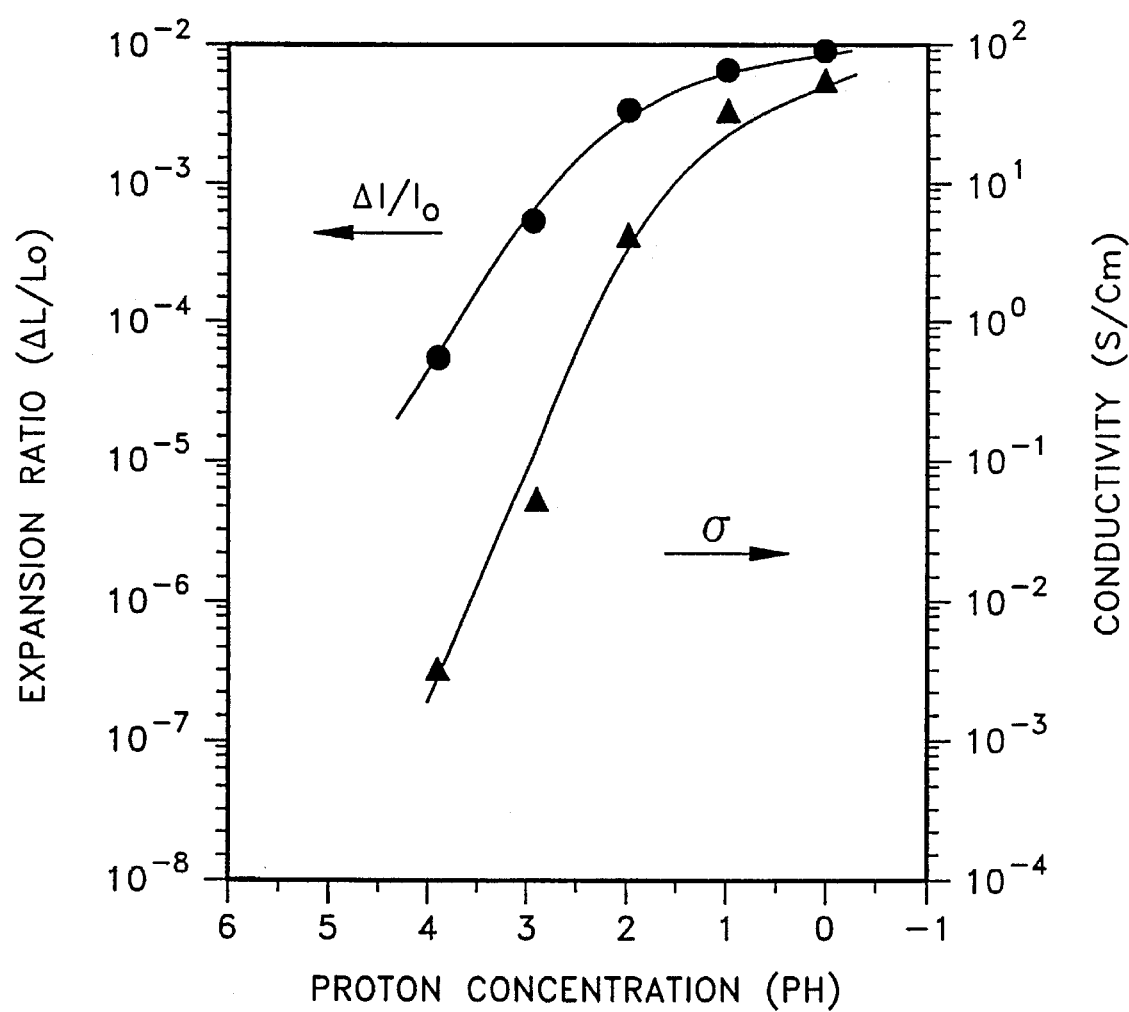
FIG. 6 is a graphical representation of the results obtained from the exposure of an actuator constructed in accordance with FIG. 3 in various aqueous solutions of varying pH.

The pH actuator was immersed in an aqueous HCl solution, the bending of the film, convex at polyaniline film side, was observed several minutes after immersion. It took about 8 hours to reach equilibrium. The bending angle was about 18° at a pH of 0. The expansion ratios and conductivities of the film were obtained at various pH levels of HCl in aqueous solution as shown in FIG. 6. The emeraldine film expands about 0.44% in length by doping in 1M HCl.

Figure 7:
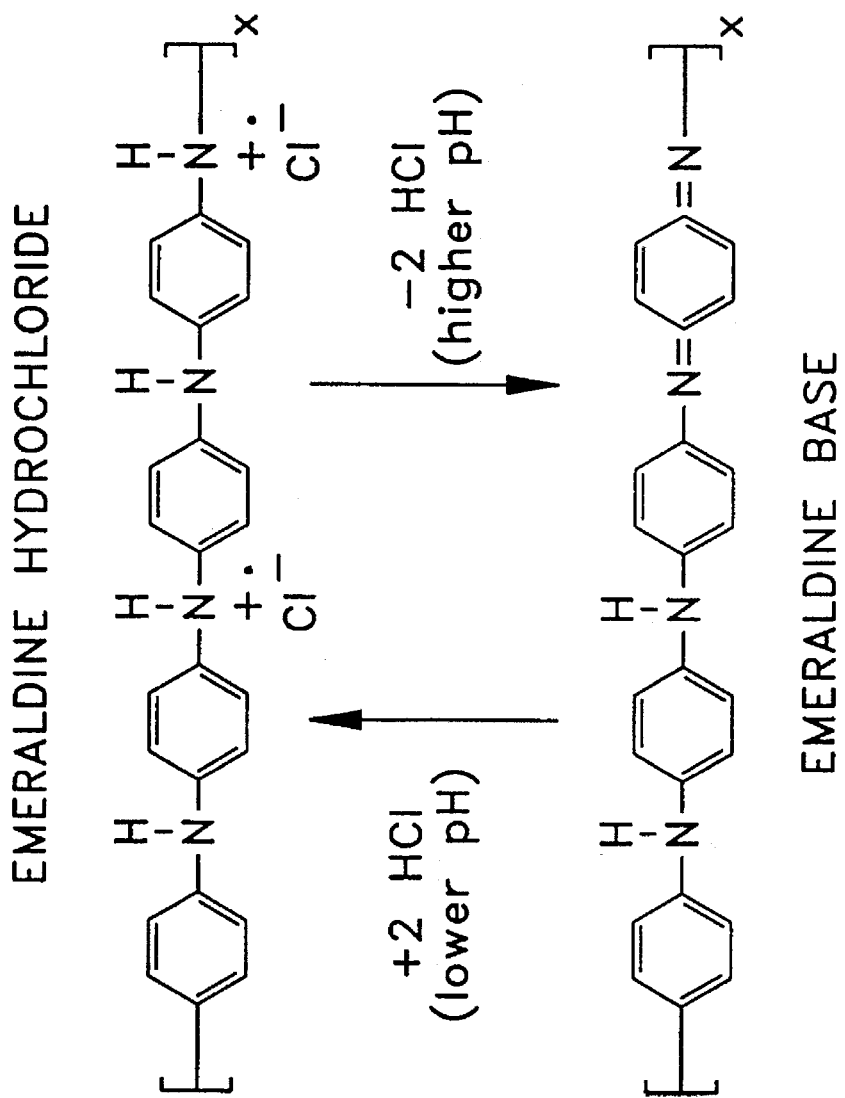
FIG. 7 is a representation of the oxidation cycle for the polyaniline film during protonation and deprotonation.

The doping (protonation) chemical reaction which occurs is summarized by reference to FIG. 7. The extent of doping increases as the pH is decreased. The inverse un-doping (deprotonation) chemical reaction occurs on reducing the pH. The dimensions of the film change in opposite directions during the doping and un-doping reactions.

What is claimed is:

1. A controllably deformable laminate comprising:
   (a) a first flexible layer comprising an electronically conductive salt of polyaniline;
   (b) a second flexible layer of electronically conductive material, surmounting said first layer, said second layer comprising a polymeric material comprising polyaniline, polypyrrole, or polyacetylene; and
   (c) a flexible, electronically insulating and ionically non-conducting layer, interposed between said first and said second electronically conductive polymeric layers.

2. The laminate of claim 1 wherein said second conductive layer comprises an electronically conductive salt of polyaniline.

3. The laminate of claim 2 further comprising control means for applying an electric current to said first and second conductive layers of said laminate.

4. The laminate of claim 2 further comprising current acceptor means for accepting an electric current from said first and second conductive layers of said laminate.

5. The laminate of claim 2 wherein the first flexible layer has a thickness of from about 1 micron to about 200 microns.

6. The laminate of claim 2 wherein the interposed layer is an adhesive material.

7. A controllably deformable laminate comprising:
   (a) a first flexible layer comprising an electronically conductive salt of polyaniline;
   (b) a second flexible layer of electronically conductive material surmounting said first conductive polymer layer; and
   (c) an electronically insulating, ionically conducting, flexible layer, interposed between the first and second electronically conductive layers.

8. The laminate of claim 7 wherein said interposed layer comprises an aqueous electrolyte.

9. The laminate of claim 7 wherein said interposed layer comprises a solid polymer electrolyte.

10. The laminate of claim 9 wherein said solid polymer electrolyte comprises polyethylene oxide.

11. The laminate of claim 7 wherein said second flexible layer comprises an electronically conductive salt of polyaniline.

12. The laminate of claim 11 further comprising control means for applying an electric current to said first and second conductive layers of said laminate.

13. The laminate of claim 11 further comprising current acceptor means for accepting an electric current from said first and second conductive layers of said laminate.

14. The laminate of claim 11 wherein said interposed layer comprises an aqueous electrolyte.

15. The laminate of claim 11 wherein said interposed layer comprises a solid polymer electrolyte.

16. The laminate of claim 11 wherein the first flexible layer has a thickness of from about 1 micron to about 200 microns.

17. The laminate of claim 16 wherein the second flexible layer has a thickness of from about 1 micron to about 200 microns.

18. The laminate of claim 7 wherein the interposed layer is an adhesive material.

19. The laminate of claim 7 wherein the first flexible polyaniline layer has an outer exposed face opposite said interposed layer, further comprising an adhesive, electrically insulating layer surmounted on said outer exposed face of said first flexible layer.

20. The laminate of claim 19 wherein the second flexible layer comprises an electrically conductive salt of polyaniline.

21. The laminate of claim 20 wherein the second flexible layer has an outer exposed face opposite said interposed layer, further comprising an adhesive, electrically insulating layer surmounted on the outer exposed face of said second flexible layer.

* * * * *